March 5, 1968 — C. E. RUFF ET AL — 3,371,447
TRIM STRIP STRUCTURES AND METHODS FOR THEIR MANUFACTURE
Filed Feb. 3, 1965 — 2 Sheets-Sheet 1

INVENTORS
CHARLES E. RUFF
STANLEY GOMEZ
BY NORMAN C. JACKSON
Myer, Baldwin, Doran & Egan
ATTORNEYS

United States Patent Office 3,371,447
Patented Mar. 5, 1968

3,371,447
TRIM STRIP STRUCTURES AND METHODS FOR THEIR MANUFACTURE
Charles E. Ruff, Lakewood, Stanley Gomez, Cleveland, and Norman C. Jackson, Sheffield Lake Village, Ohio, assignors to The Standard Products Company, Cleveland, Ohio, a corporation of Ohio
Filed Feb. 3, 1965, Ser. No. 429,986
10 Claims. (Cl. 49—490)

This invention relates to protective and decorative trim strips for mounting to edge flanges and to a continuous strip structure from which the trim strips are made, said trim strips being particularly adapted for mounting on the edge of an automobile door for enclosing the opening between the door and an adjacent member, protecting the trailing edge of the door against chipping and scuffing of the finish, and generally enhancing the appearance of the vehicle.

The invention has for its primary object the provision of an article of the aforesaid nature which is characterized by its structural simplicity, its inexpensive manufacturing costs, the attractive forms in which it may be made, and the particularly effective manner in which it performs its function.

A more specific object of the present invention is to provide a strip structure of the above type which can be shaped to conform to the irregular contours of a modern automobile door.

Another object is to provide such a strip structure having a core made of malleable sheet material and a resilient cover encasing said core.

Still another object is to provide a strip structure as set forth above wherein the core is made of sheet metal in the form of a multiplicity of elongated, riblike, generally transverse elements bent into a U-shape and defining a continuous channel, thereby providing transverse rigidity to the strip while at the same time affording flexibility of the strip.

Yet another object is to provide a strip structure as described wherein the elements are initially attached to each other at mutually directed ends along edge portions of the core with a substantial portion of each element being spaced from the adjacent element and with the ends of said elements which define one edge portion of the channel being separated from each other in use of the strip structure.

A further object is to provide a strip structure having the above features wherein the ends of said elements are initially attached along both edges of said core with the ends of said elements which define said one edge portion of the channel breaking apart from each other upon flexing of the strip structure.

A further object is to provide a strip structure as set forth above wherein the core edge portion which defines said one edge portion is substantially reduced in thickness whereby the elements readily break apart upon flexing of the strip structure.

Another object is to provide such a strip structure wherein the core edge portion which defines said one edge portion is coined to facilitate the breaking apart of the elements.

Still another object is to provide a strip structure of the above type wherein the core edge portion which defines the edge portion of said channel which is opposite said one edge portion remains unbroken and the elements adjacent thereto remain contiguous whereby said cover retains a smooth outer surface adjacent to said opposite edge portion.

Yet another object is to provide a door edge trim strip wherein the ends are formed to a pleasing shape.

Still another object is to provide a method for manufacturing the trim strip of this invention.

Further objects of the present invention, and a number of its advantages, will be referred to in or will be evident from the following description of four embodiments of the invention as illustrated in the accompanying drawings.

FIG. 1 of the drawings is a perspective view of a portion of an automobile, shown in broken lines, said perspective including trailing edge portions of the automobile doors having the trim strips of this invention mounted thereto.

Before the articles illustrated are specifically described, it is to be understood that the invention here involved is not limited to the structural details or arrangement of parts shown since strip structures or trim strips embodying the present invention may take various forms. It is also to be understood that the phraseology or terminology herein employed is for the purpose of description and not of limitation since the scope of the present invention is denoted by the appended claims.

Figure 1:
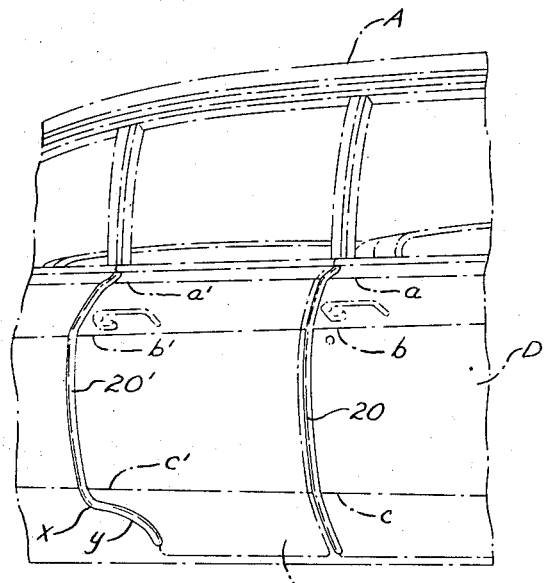

Referring now to the drawings and particularly to FIG. 1, trim strips of this invention are shown at 20 and 20' secured to the trailing edges of doors D and D', respectively, of a typical, modern automobile A. As herein illustrated, the trim strips extend from just below the lower edges of the window frames or window openings downwardly to a point adjacent to the lower edges of the doors, but it will be readily understood that such trim strips may, if desired, be extended to the tops of the doors or to any other edge portions of the doors having suitable flanges for attaching thereto. The outer transverse contours of the doors D and D' conform to and provide a continuation of the outer contour of the automobile itself in accordance with current automotive designs, the body and doors of the vehicle being generally outwardly convex with intermittent, relatively sharper bends to the contour as illustrated at $a, a', b, b', c$ and $c'$.

In accordance with one of the express objects of this invention, the trim strips 20 and 20' are constructed in such manner that they are readily shaped to conform to the transverse contour of the body while retaining a smooth, attractive outer surface thereby enhancing the beauty of the vehicle. Said trim strips are also readily shaped to the contours of the trailing edges of the doors in the plane of the doors themselves. This characteristic of being formable in two, right angularly disposed planes is inherent in the strip structure from which the trim strip is made, as will become herein later fully apparent. The trim strip 20' illustrates the manner in which the strip structure is formable, in the plane of the door D', to provide either a convex curve as shown at x or a concave curve as shown at y.

Figure 2:
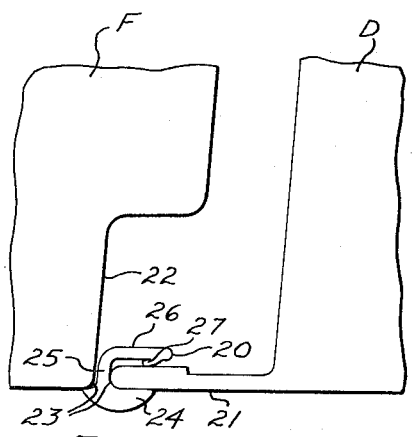
FIG. 2 is an outline drawing of the sectional contour of an automobile door, door frame, and trim strip.

FIG. 2 shows in outline form typical contours of the door D and a door frame F wherein said door is provided with a rearwardly projecting flange 21 the edge of which is closely adjacent to a step 22 of said frame when the door is in the closed position. The outer surface of the door D and the outer surface of the frame F are generally coplanar at every point as described with a small clearance opening being provided at 23 to prevent the edge of the door from striking the door rame.

The trim strip 20, which is identical in structure to the trim strip 20', is generally U-shaped having an outer trim or bumper portion 24, a central web portion 25, and an inner leg 26. A rib 27 which is carried on the inner surface of the leg 26 is angled inwardly and toward the bottom of the U to provide a gripping member for engaging the inner surface of the door flange 21 thereby increasing the biting or gripping effect of the trim strip.

Figure 3:
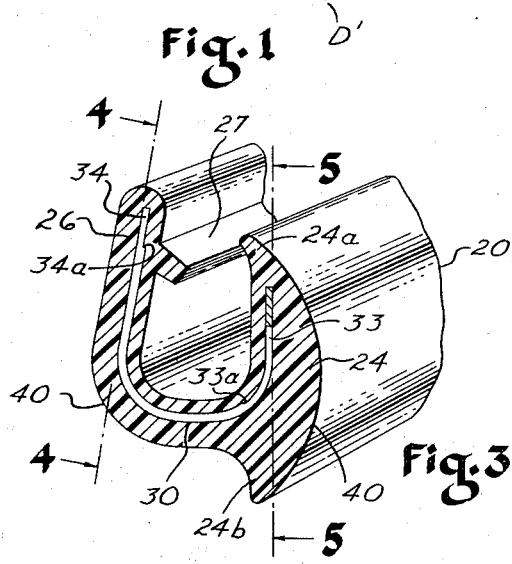
FIG. 3 is an enlarged perspective view of a portion of the trim strip, the forward end of the strip being shown in section.

FIG. 3 illustrates the construction of the trim strip 20. Because the trim strips 20 and 20' are made from the same strip structure and are identical with the exception of their different shapes conforming to the different contours of the door edges, only the trim strip 20 will be described in detail, said trim strip comprising a U-shaped core 30 which is preferably made from thin sheet metal. The core 30 carries a cover 40 preferably made of a suitable resilient, thermoplastic material which can be extruded over the core or otherwise suitably applied thereto and which is reheated for shaping the ends of the strip. The construction of the core 30 and its relationship with the cover 40 will be best understood by further reference to FIGS. 4–7 which show the various parts and elements of the trim strip structure.

Figure 6:
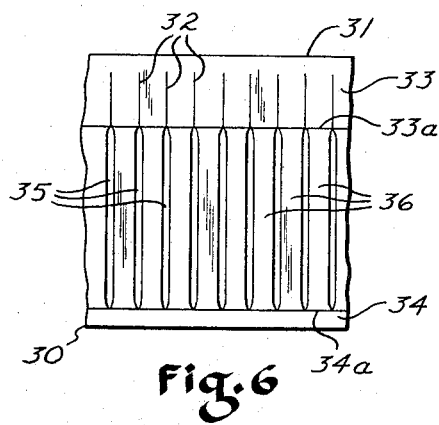
FIG. 6 is a plan view of the sheet metal core of the trim strip prior to its being shaped and covered.

The core 30 is made from a strip of relatively thin, sheet metal 31 which is initially transversely lanced at regular intervals throughout its length to provide transverse slits 32 terminating in either transverse direction short of the lateral edges of said strip (FIG. 6). Edge portions of the strip 31 are then reduced in thickness by any suitable means, such as by passing the edge portions through pressure rollers, whereby said strip is elongated. The reduced portion on the upper side of the strip as shown in FIG. 6 is indicated at 33 and extends inwardly from the adjacent side edge of the strip to the crease or ridge shown at 33a. The reduced portion at the opposite edge of the strip is shown at 34 and extends inwardly from said opposite edge to the crease or ridge 34a. It will be noted that the slits 32 extend into the reduced portion 33 and that these portions of the slits do not open up or separate because the metal in that area is stretched uniformly between the original slits. However, the portion of the strip which is disposed between the ridge 33a and the ridge 34a is not reduced, and the slits 32, therefore, separate and become transverse slots as indicated at 35. Thus, the core 30 comprises, in effect, a multiplicity of relatively thin, narrow, transverse elements as designated by the numeral 36 which are connected to each other by very thin sheet metal edge portions, the major portions of said eleemnts being substantially separated from each other by the slots 35.

Figure 7:
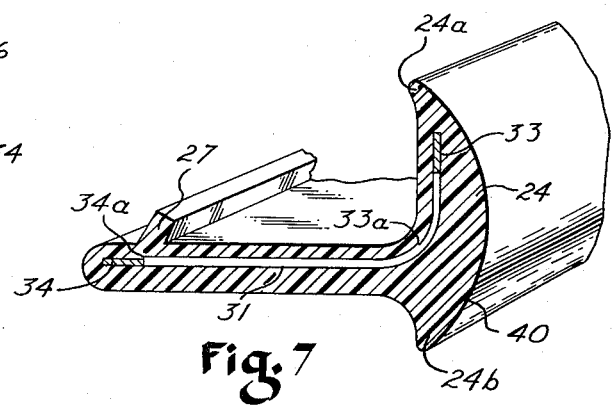
FIG. 7 is a perspective view of the trim strip with the core partially formed and the cover added thereto, the forward end of the trim strip being shown in section.

FIG. 7 shows a subsequent step in the manufacture of the trim strip 20 wherein the core 30 is bent upwardly about a radius to dispose the reduced portion 33 substantially at right angles to the remainder of the strip 31. With the strip 31 in this shape, the cover 40 is applied thereto by a suitable method such as extrusion. The trim or bumper portion 24 is formed generally around the upstanding reduced portion 33, said bumper being outwardly convex and formed to provide a lip 24a extending beyond the reduced portion 33 and oppositely projecting lip 24b projecting beyond the general plane of the strip 31. The cover 40 completely encases the core 30 covering both sides of the strip 31 and providing the obliquely angled, gripping rib 27, integrally formed with the cover, adjacent to the edge of the strip having the reduced portion 34.

While the trim strip 20 is in the shape shown in FIG. 7, the edge portion thereof having the reduced portion 34 imbedded therein is flexed to cause the elements 36 to break apart from each other in the area of said reduced portion 34. The reduced thickness of the metal at this edge of the strip 31 causes such breakage between the elements since the thin metal readily breaks down due to fatigue during flexing. The breakage occurs generally transversely of the strip in alignment with the slots 35 from the lateral edge of the strip to the ridge 34a. The result is that whereas the core is still integrally connected on one side within the bumper 24, the transverse elements 36 are completely separated within the covering at the opposite edge of the strip 31.

After the elements 36 have been separated at one edge, the trim strip 20 is then bent to the shape shown in FIG. 3 which is its final shape prior to being applied to an automobile door. The separated ends of the elements 36 are bent upwardly from the position shown in FIG. 7 thus giving the trim strip a U or channel-shape with the disconnected element portions and the cover therefor constituting the aforementioned inner leg 26. This final shaping also disposes the rib 27 of the cover 40 inwardly along the inside of the channel with said flange being directed obliquely inwardly and toward the bottom of the channel.

Figure 4:
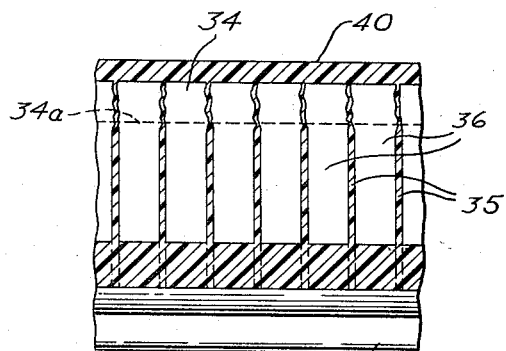
FIG. 4 is a section taken along the line 4—4 of FIG. 3.

FIG. 4 shows the separated end portions of the transverse elements 36 which have been broken by the flexing while imbedded within the cover 40. Said cover, being applied to the core 30 in a molten state, is disposed in the slots 35 around the elements 36 whereby said cover and core are locked firmly together. However, because the cover 40 is resilient in nature, the entire strip may be bent or shaped, either in a plane parallel with the bumper 24 or in a plane at right angles thereto, with the elements 36 being able to move toward or away from each other a slight extent as may be necessary to accommodate to the curvature of an automobile door or door flange.

Figure 5:
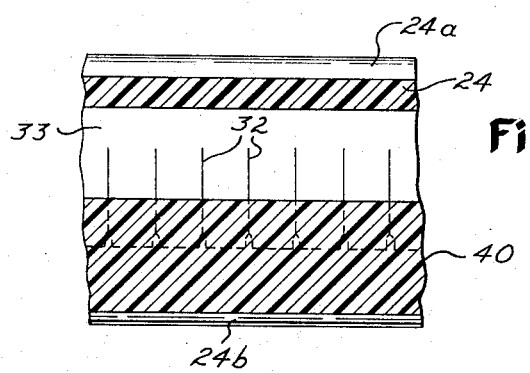
FIG. 5 is a section taken along the line 5—5 of FIG. 3.

As hereinabove discussed, the reduced portion 33 which presents no open slots 35 is disposed within the bumper 24. It is desirable to have no slots in the core at this point since there is a tendency for covering material, especially if it is of a thermoplastic nature, to shrink into any slots or openings and leave corresponding ridges, bumps, or dimples on the outer surface of the trim or bumper portion. By keeping this portion of the core unslotted, the trim or bumper 24 remains smooth and attractive on its outer surface where it adds to the beauty of the vehicle. FIG. 5 clearly illustrates the manner in which only the slits 32 defined by contiguous edge portions of the transverse elements 36 are disposed within the trim or bumper 24.

Figure 8:
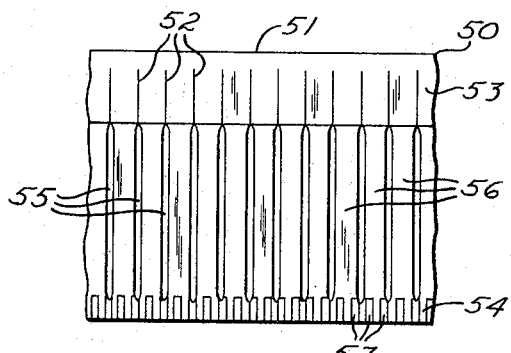
FIG. 8 is a plan view similar to FIG. 6 of a second embodiment of the core.

FIG. 8 shows a modified core 50 which may replace the core 30 in the structure described above to be used in exactly the same manner as said core 30. The core 50 is identical in most respects to the core 30, said core 50 comprising a sheet metal strip 51 having a multiplicity of transverse slits 52 and being reduced in thickness at its edges to provide reduced portions 53 and 54. Reducing the thickness of the edge portions causes an elongation of the strip 51 whereby slots 55 are provided between portions of each adjacent pair of transverse elements 56. The embodiment of FIG. 8 differs from that shown in FIG. 6 in that the reduced portion 54, at the edge of the strip which will be eventually flexed and broken, is coined. Coining comprises providing said reduced portion 54 with longitudinally spaced depressions 57 which additionally reduces the thickness of the metal at said depressions. The coining of the edge increases the tendency of the metal to fracture thereby aiding in causing the ends of the elements 56 to break apart upon flexing as described in connection with the first embodiment of the invention.

Figure 9:
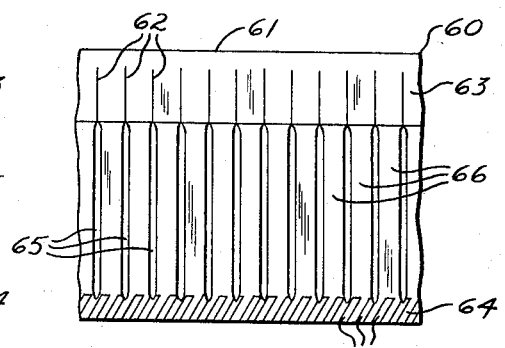
FIG. 9 is a plan view similar to FIGS. 6 and 7 of a third embodiment of the core.

FIG. 9 shows a further modification comprising a core 60 made from a sheet metal strip 61 having transverse slits 62 and reduced side edge portions 63 and 64. The core 60 also has transverse elements 66, major portions of which are separated by slots 65.

The core 60 is identical in all respects with the core 50 with the exception that the coining at the reduced portion 64 comprises a multiplicity of longitudinally spaced, obliquely disposed depressions 67. The coining in the embodiment of FIG. 9 has the same purpose as the coining in FIG. 8, that of facilitating the breaking apart of the ends of the elements 66 upon flexing of the reduced edge portion at 64. By disposing the depressions obliquely of the strip rather than transversely, it has been found that the metal tends to rip or tear apart along such angle and therefore separates the ends of the elements efficiently upon flexing.

Figure 10:
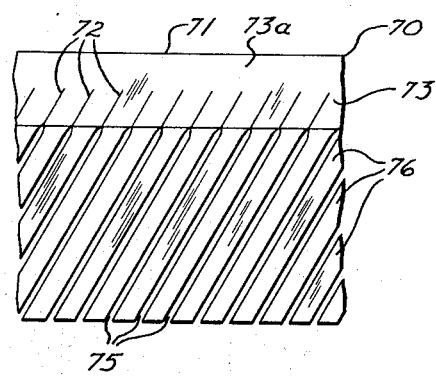
FIG. 10 is a plan view similar to FIGS. 6, 8 and 9 of a fourth embodiment of the core.

The final modification illustrated in FIG. 10 shows a core 70 which may replace any of the above described cores, 30, 50 and 60. The core 70 is also made from a sheet metal strip 71, said strip being initially provided with a multiplicity of longitudinally evenly spaced, obliquely disposed slits 72. The core 70 differs from the above described cores in that the slits 72 are disposed at an angle, approximately 30 degrees as herein illustrated, and extend all the way through one edge of the strip while terminating substantially inwardly of the opposite edge thereof. A reduced edge portion 73 is, therefore, only provided at the edge where the transversely obliquely disposed elements, shown at 76, are connected. As in the above embodiments, reducing the edge portion 73 stretches or elongates the metal whereby, beyond said reduced portion, the elements 76 are separated by slots as shown at 75. In this final embodiment, it is preferred that the unslitted portion of the reduced portion 73, indicated by the numeral 73a, be of a greater transverse dimension than a similar portion in the previous embodiments to obtain the necessary stiffness to the strip for use during the extrusion or application of the cover 40 thereon. This final embodiment has the advantage that the flexing step is unnecessary in the manufacture of the strip structure because the elements 76 are already separated adjacent to one edge of said strip.

The upper and lower ends of the trim strip 20, after the strip structure as described has been cut to the desired length, may be finished off in any suitable manner. It is preferred that the ends be closed to prevent moisture from getting to and causing the deterioration of the metallic core 30. This may be done by dipping the ends of the strip in a suitable plastic sealer, brushing the ends of the strip with said sealer, or by removing a short portion of the core from each end and suitably shaping it to a desirable, graceful form while at the same time closing the cover over the end of the core.

Figure 11:
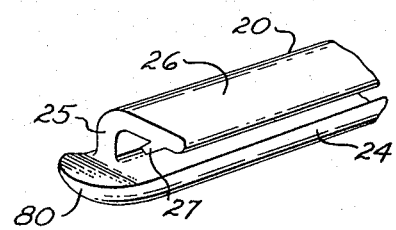
FIG. 11 is a perspective view of the end of the trim strip in its finished form.

FIG. 11 shows an end portion of the trim strip 20 in an exemplary finished form, it being understood that such end portion may take any desired shape. As herein illustrated, the trim strip 20 is provided with a rounded end portion 80 which comprises a short, projecting portion of the bumper 24 which has its outer surface gracefully curved inwardly toward the inner surface of said bumper. The web portion 25 and the leg 26 are cut back away from the tip of the end portion 80, and said end portion is preferably tipped or tilted inwardly when formed whereby said tip will seat firmly against a flange to which it is mounted.

It will be understood that many changes in the details of the invention as herein described and illustrated may be made without, however, departing from the spirit thereof or the scope of the appended claims.

What is claimed is:

1. A trim strip structure for securing to the edge flange of an automobile door for bridging the opening between the door edge and an adjacent member, said structure comprising a channel-shaped, flexible core of sheet material having leg portions for gripping either side of the flange; said leg portions being joined at their outer ends by a central web; a flexible cover encasing said core; said cover including a bumper portion disposed substantially coplanar with one of said leg portions for mounting to the outside surface of the door flange; said bumper portion having a lip portion extending outwardly beyond said web for projecting over said opening when the door is closed.

2. A trim strip structure for securing to the edge flange of an automobile door for bridging the opening between the door edge and a door frame, said structure comprising a channel-shaped, flexible core of sheet material having inner and outer leg portions for gripping either side of the flange; said leg portions being joined at their outer ends by a central web; a flexible cover encasing said core; said cover including a bumper portion disposed substantially coplanar with said outer leg portion whereby it is disposed on the outside surface of said flange in use; said cover including a rib carried on the inner surface of said inner leg for gripping the inner surface of said flange; said bumper portion having a lip portion extending outwardly beyond said web and projecting over said opening when the door is closed.

3. A trim strip structure for securing to an edge flange of an automobile door for bridging the opening between the door edge and a door frame, said structure comprising a channel-shaped, flexible core having inner and outer leg portions for gripping either side of the flange; said leg portions being joined by a central web portion; said core being made up of a multiplicity of U-shaped elements connected together in contiguous relationship along said outer leg portion of the channel and being otherwise disconnected; a flexible cover encasing said core; said cover including a bumper portion disposed substantially coplanar with said outer leg portion and overlapping an edge portion of the flange; said bumper portion having a lip portion extending beyond said web and over said opening.

4. A trim strip structure for securing to an edge flange of an automobile door, said structure comprising a channel-shaped, flexible core made of sheet metal having inner and outer leg portions for gripping either side of the flange; said leg portions being joined by a central web portion; said core being made up of a multiplicity of elongated, narrow, flat elements bent to similar U-shapes, said elements being integrally and contiguously connected together along said outer leg portion only of hte channel and having substantial portions thereof spaced from each other longitudinally of the channel at said inner leg portion of the channel; and a flexible cover encasing said core.

5. A trim strip structure for securing to an edge flange of an automobile door for bridging the opening between the door edge and the door frame, said structure comprising a channel-shaped, flexible core made of sheet metal having inner and outer leg portions for gripping either side of the flange; said leg portions being joined by a central web portion; said core being made up of a multiplicity of elongated, narrow, flat elements bent to like U-shapes, said elements being integrally and contiguously connected together along said outer leg portion only of the channel and having substantial portions thereof spaced from each other longitudinally of the channel at said inner leg portion of the channel; a flexible cover encasing said core; said cover including a bumper portion disposed substantially coplanar with said outer leg portion and overlapping an edge portion of the flange; said bumper portion having a lip portion extending beyond said web and over said opening.

6. A trim strip structure for securing to an edge flange of an automobile door for bridging the opening between the door edge and the door frame, said structure comprising a channel-shaped, flexible core made of strip sheet metal having inner and outer leg portions for gripping either side of the flange; said leg portions being joined by a central web portion; said strip being provided with a multiplicity of oblique slots extending from the edge of said strip along said inner leg portion and terminating short of the edge of said strip along said outer leg portion; said slots defining a multiplicity of narrow, elongated flat elements, said elements being integrally connected together along said outer leg portion only of the channel and being spaced from each other longitudinally of the channel at said inner leg portion of the channel; a flexible cover encasing said core; said cover including a bumper portion disposed substantially coplanar with said outer leg portion and overlapping an edge portion of the flange; said bumper portion having a lip portion extending beyond said web and over said opening.

7. The method of making a channel-shaped strip structure for engaging an edge flange comprising the step of providing a flat strip of sheet metal with a series of slits obliquely disposed in a general transverse direction relative to the strip, said slits opening at one side edge of the strip and terminating inwardly of the other side edge; the step of elongating said strip by reducing the thickness of the unslitted portion of said strip adjacent to said other side edge thereby changing said slits into slots; the step of applying a covering to the strip; and the step of bending the strip into U-shape.

8. The method of making a channel-shaped strip structure for engaging an edge flange comprising the step of providing a flat strip of sheet metal with a series of uniformly spaced, generally transverse slits which terminate short of the side edges of the strip and provide narrow, generally transverse elements therebetween; the step of elongating the strip by reducing the thickness of the unslitted side edge portions thereby changing the slits into slots and spacing the element apart; the step of coining one of said edge portions by providing it with a series of longitudinally spaced, transverse depressions; the step of applying a covering to the strip; the step of flexing said one edge portion of the strip and causing the elements to break apart inside said covering along said one edge portion; and the step of bending the strip into channel shape.

9. The method of making a channel-shaped strip structure for engaging an edge flange comprising the step of providing a flat strip of sheet metal with a series of uniformly spaced, generally transverse slits which terminates short of the side edges of the strip and provide narrow, generally transverse elements therebetween; the step of elongating the strip by reducing the thickness of the unslitted side edge portions thereby changing the slits into slots and spacing the elements apart; the step of providing oblique coining along one of said edge portions by providing it with a series of longitudinally spaced, obliquely directed depressions; the step of applying a covering to the strip; the step of flexing said one edge portion of the strip and causing the elements to break apart inside said covering along said one edge portion; and the step of bending the strip into channel shape.

10. The method of making a channel-shaped strip structure for engaging an edge flange comprising the step of providing a flat strip of sheet metal with a series of uniformly spaced, generally transverse slits which terminate short of the side edges of the strip and provide narrow, generally transverse elements therebetween; the step of elongating the strip by reducing the thickness of the unslitted side edge portions thereby changing the slits into slots and spacing the elements apart; the step of coining one of said edge portions by providing it with a series of longitudinally spaced, transverse depressions; the step of bending the other said edge portion generally at right angles to the plane of the strip; the step of extruding a covering onto the strip; the step of flexing said one edge portion of the strip and causing the elements to break apart inside said covering along said one edge portion; and the step of bending the strip into its final channel shape.

References Cited

UNITED STATES PATENTS

| 2,132,272 | 10/1938 | Reid. | |
| 2,226,615 | 12/1940 | Killen | 296—44.6 |
| 2,740,658 | 4/1956 | Kesich | 296—44.6 |
| 2,746,103 | 5/1956 | Bright. | |
| 3,165,793 | 1/1965 | Lynch. | |
| 3,167,825 | 2/1965 | Zoller. | |
| 3,167,856 | 2/1965 | Zoller. | |
| 3,222,769 | 12/1965 | Le Plae. | |

FOREIGN PATENTS 290,163   11/1929   Great Britain.

DAVID J. WILLIAMOWSKY, *Primary Examiner.*

HARRISON R. MOSELEY, *Examiner.*

PHILLIP C. KANNAN, W. E. HEATON,
*Assistant Examiners.*